United States Patent [19]

Grachal et al.

[11] Patent Number: 5,234,018
[45] Date of Patent: Aug. 10, 1993

[54] SEWER CHECK VALVE AND CLEANOUT APPARATUS

[76] Inventors: Bruce M. Grachal, E. 905 Kidd Island Rd.; Michael R. Andrews, 7695 N. Rude, both of Coeur d'Alene, Id. 83814; Rodney C. Freligh, P.O. Box 2138, Hayden Lake, Id. 83835; Howard L. Griffiths, 1360 Lone Mountain Rd., Athol, Id. 83801

[21] Appl. No.: 977,140

[22] Filed: Nov. 16, 1992

[51] Int. Cl.⁵ .................... F16K 15/03; F16K 43/00
[52] U.S. Cl. .................................. 137/244; 137/315; 137/527; 137/527.8
[58] Field of Search .............. 137/244, 245, 247.41, 137/315, 527, 527.2, 527.6, 527.8

[56] References Cited

U.S. PATENT DOCUMENTS

| | | | |
|---|---|---|---|
| 174,857 | 3/1876 | Rodermond | 137/527.8 |
| 1,103,043 | 7/1914 | Grueninger | 137/527.6 |
| 1,553,940 | 9/1925 | Kangieser | 137/527 |
| 1,577,637 | 3/1926 | Hess | 137/527.8 |
| 1,710,410 | 4/1929 | Defenbaugh | 137/527.6 |
| 1,722,891 | 7/1929 | Boosey | 137/527.6 |
| 2,390,108 | 12/1945 | Langdon | 137/527.8 |
| 2,578,076 | 12/1951 | Kirby | 137/527.6 |
| 4,054,153 | 10/1977 | Guyton | 137/527 |
| 4,508,139 | 4/1985 | Teumer | 137/527 |
| 5,004,010 | 4/1991 | Huet | 137/527.6 |

Primary Examiner—George L. Walton
Attorney, Agent, or Firm—Paul F. Horton

[57] ABSTRACT

Sewer check valve and cleanout apparatus including a valve body, substantially inverted-T in shape, said valve body provided with a horizontal conduit and an upright external riser; an internal riser receivable within the external riser; and a flapper. The horizontal conduit of the valve body is provided with opposing end hubs for attachment to existing sewer and drainage lines and is provided, on its upstream portion with an annular valve seat about the conduit. The flapper is pivotally attached to the lowermost end of the internal riser to sealingly engage the valve seat. The internal riser, with flapper, are readily accessible for maintenance or replacement by a simple retraction of the internal riser from the external riser. The internal riser is provided with a curved bore, cooperating with a curved bore in the external riser for directing cleanout cables downstream and away from the flapper valve.

7 Claims, 1 Drawing Sheet

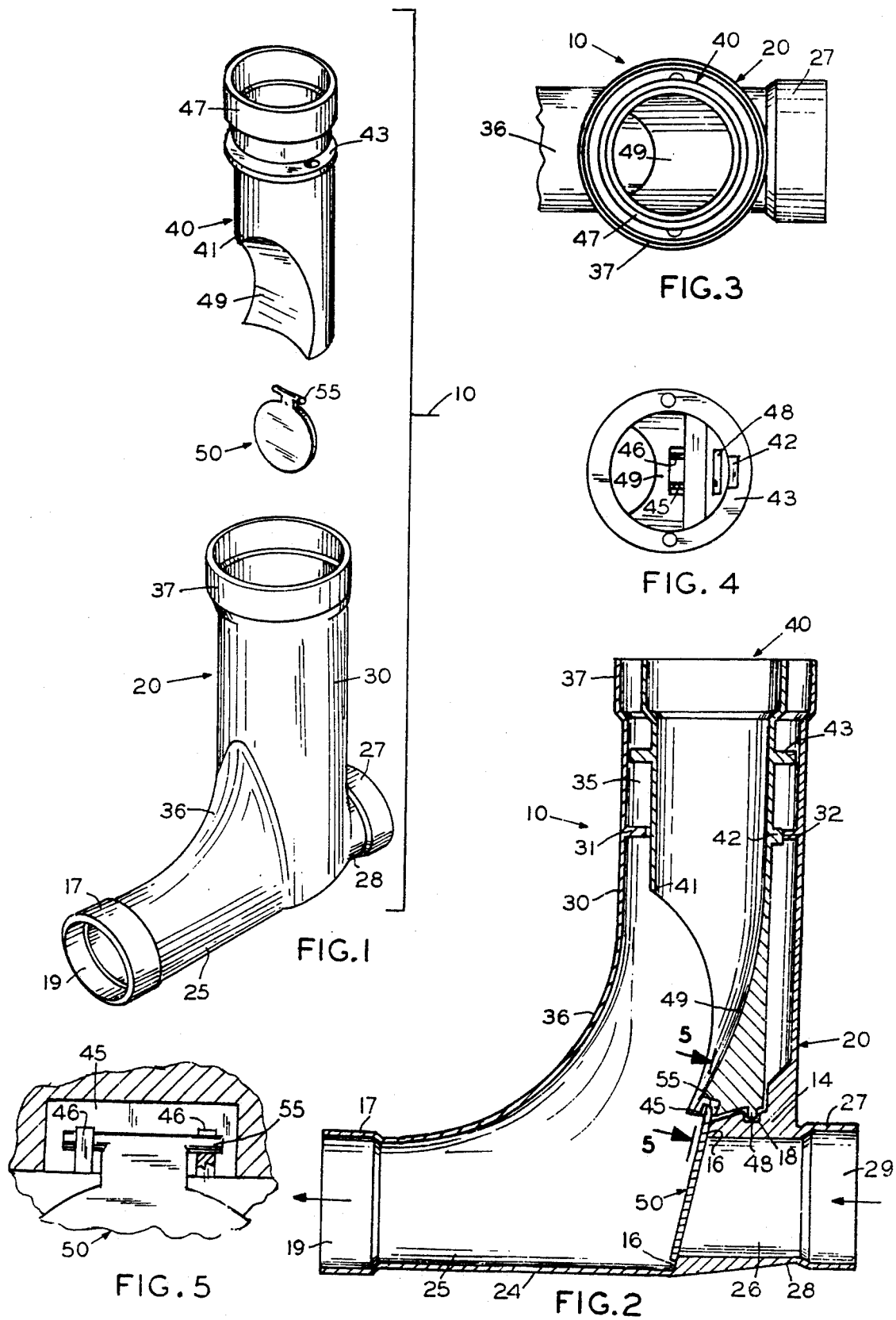

SEWER CHECK VALVE AND CLEANOUT APPARATUS

BACKGROUND OF THE INVENTION

1. Field of the Invention

This invention relates to backwater valve structures for sewage and drainage conduits and also to sewer cleanout devices.

2. Description of the Prior Art

It is highly desirable and usually mandatory, in the plumbing art, that backwater valves, often deeply buried, be readily accessible for replacement and maintenance. It is also highly desirable, for reasons of cost efficiency and labor efficiency, that a minimum of structure be involved for both backwater valves and for sewer and drainage clean-outs.

Backwater valves are required by law in many municipalities for a variety of reasons. It is becoming increasingly common for cities, municipalities, and sewer districts to specify the use of backwater valves on all installations so as to protect themselves from liability in cases where a clogged sewer line should back up in situations where backflow may be caused by maintenance workers during pressure flushing operations or for other reasons. All backwater valves, presently known, are accessible only by means of a masonry pit or a manhole, except for those within an arm's reach of ground level. As the depth of a drainage line or sewer line, the term herein used interchangeably, increases, especially in situations such as basement drainage applications, the cost of providing a masonry pit or manhole becomes increasingly costly, inconvenient, and often unsightly. Because of these difficulties, legal requirements are often not enforced.

In an attempt to overcome the problems associated with access to backwater valves, a device, shown in U.S. Pat. No. 2,718,238, issued to A. Simko, Sr., was invented. The Simko device utilizes a solid stem, defining a narrowed horizontal conduit complete with valve seat and flapper, which is receivable within a vertical sleeve intersecting with drainage inlet and outlet conduits. In this manner, the stem of the Simko device may be removed for maintenance or replacement of the entire valve system. The Simko invention, however, suffers from several serious flaws and therefore has not been adopted by the industry. Simko does not provide a valve seat about the entirety of the horizontal drainage pipe; constricts and obstructs the horizontal pipe, which is now against regulations; and is subject to displacement or partial displacement of the stem and entire valve system by backwater pressure. Further, clean-out capabilities are not present without complete removal of the backwater trap.

SUMMARY OF THE INVENTION

These and other problems are eliminated by the present invention which provides for a backwater valve and drainage line clean-out which includes a valve body with horizontal conduit and external riser; a hollow internal riser adapted to seat with the external riser; and a flapper, downwardly pivotably depending from the internal riser to seat upon an annular valve seat defined about the horizontal conduit of the valve body.

It is therefore a primary object of the present invention to provide sewer check valve and cleanout apparatus which permits ready access to the valve flapper for inspection and maintenance and which permits downstream drainage cleanout while the valve is in place.

It is also an important object of the present invention to provide sewer check valve and cleanout apparatus which does not require a manhole or masonry pit and which is accessible at any depth.

Another object of the present invention is to provide sewer check valve and cleanout apparatus which includes a bore, curved to the downstream side of a drainage pipe, away from the check valve, for directing cleanout cables.

Still another object of the present invention is to provide sewer check valve and cleanout apparatus which includes an internal riser which includes guide means and support means for precise alignment and fixed positioning of the internal riser and depending flapper relative to a valve seat.

An additional object of the present invention is to provide sewer check valve and cleanout apparatus which includes a minimum of parts for superior performance and cost efficiency.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is an exploded perspective view of the valve body, internal riser and flapper of the present invention.

FIG. 2 is a side sectional view of the apparatus of the present invention, showing the internal riser with downwardly depending flapper seated in place within the valve body.

FIG. 3 is a plan view of the apparatus showing the internal riser installed with the external riser of the valve body.

FIG. 4 is a bottom view of the internal riser.

FIG. 5 is a view taken along lines 5—5 of FIG. 2.

DETAILED DESCRIPTION OF THE INVENTION

Referring now to the drawings and to FIGS. 1 and 2 in particular, an embodiment to be preferred of sewer cleanout and check valve apparatus 10, made according to the present invention is disclosed. Apparatus 10 includes, generally, a valve body 20; an internal riser 40; and a flapper 50. All components may be manufactured by a molding process using polyvinyl chloride or other suitable materials as construction materials.

Valve body 20 is substantially inverted-T in shape and includes a horizontal sewage or drainage conduit 25 and an upright external riser 30. Sewage conduit 25 may be of any suitable length and includes a bore 26, circular in cross-section, of a suitable diameter. The upstream side or portion 28 of the conduit is provided with an intake port 29 defined by a hub 27 for connection to an existing drainage line, not shown, and not a part of the present invention. Bore 26 is, it is to be noted, unobstructed and is surrounded, at the terminal end of the upstream portion's confluence with the downstream portion 24, by an annular valve seat 16. The valve seat has a slight deviance, ie., is tilted, from top to bottom so that flapper 50 is tilted slightly downstream from vertical, when in place, as is shown in FIG. 2, so as to be held in engagement with the valve seat by the force of gravity. The valve seat 16, at its lowermost end, also shown to advantage in FIG. 2, provides a slight drop in the longitudinal axis level from upstream portion 28 to downstream portion 24 to more than compensate for energy loss by fluid in the pivoting of flapper 50 in its movement downstream through the conduit. The downstream portion 24 of the horizontal conduit is provided with a discharge port 19 defined by a hub 17 for connection to an existing downstream drainage line, not shown. Flow of sewage is shown by the arrows.

External riser 30 of valve body 20, upwardly extending from horizontal conduit 25, is provided with an internal bore 35, intersecting with and in communication with the horizontal conduit, downstream from valve seat 16. Bore 35 is provided with guide means, preferably including a guide ring 31 provided with one or more slots 32 for receiving a respective key or keys 42 of internal riser 40 for alignment of the internal riser with the bore of the external riser. As will be noted from the drawings, the diameter of bore 35 is somewhat greater than the external dimensions of the internal riser 40 so that the internal riser may readily be received therein. A forward wall 36 of external rise 30 is curved to cooperate with curved walls of internal riser 40 for directing clean-out cables, and the like, downstream from flapper 50, as will hereinafter be described. The external riser may be of any suitable height and is preferably fitted with a hub 37 for any desired vertically upward extension and for placement of a cap, if desired. It is contemplated that any extension will be to ground level, or above.

Valve body 20, at a position just above upstream portion 28 of horizontal conduit 25, is provided with a shelf-like mount 14 for supporting internal riser 40. Internal riser mount 14 has a supporting surface matingly engageable with the lower back surface of internal riser 40, and includes a pin slot 18 for receiving pin 48 of the internal riser to prevent lateral movement of the internal riser in respect to the valve body. The supporting surfaces, and pin within pin slot, support the internal riser at a selected height above horizontal conduit 25 of the valve body for precise positioning of flapper 50, pivotally and downwardly depending from the internal riser.

Internal riser 40 is preferably provided with a stabilizer ring 43 adjacent its uppermost end for engaging the internal bore 35 of external riser 30. Ring 43, in cooperation with slotted ring 31 of the external riser, serves to guide the internal riser in its reciprocal movement to and from the external riser during its removal from the replacement within the external riser, respectively.

At its lowermost forward end, internal riser 40 is provided with a flapper mount 45. Flapper mount 45 preferably includes a pair of laterally spaced snap slots 46, shown to advantage in FIG. 4, for pivotally receiving flapper hinge pin 55. At its uppermost end, the internal riser is provided with a hub 47 for vertical extension of the riser to the height of any extension of the external riser. At its lowermost end, front wall 41 of internal riser 40 is cut away and its back end and side walls 49 curved in an arc akin to the curvature of front wall 36 of the external riser to provide unobstructed guidance of any maintenance cable or clean-out equipment to the downstream drainage lines, not shown, which are connected to valve body 20 by means of hub 17. It will be appreciated that flapper 50 remains in place to serve as a backwater valve during this procedure, as any cable is directed away from flapper 50 and its pivotal mount with the internal riser.

Flapper 50 is plate-like in construction and is of a diameter sufficient to engage valve seat 16 radially outward of the periphery of bore 26 of the upstream portion 28 of conduit 25 so as to provide an unobstructed flow of sewage from the upstream to the downstream portion of the conduit. Should it be desired, flapper 50 may be provided with an annular flexible gasket for engaging valve seat 16 of the valve body.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Sewer cleanout and check valve apparatus comprising:
    a valve body including a horizontal sewage conduit;
    a valve seat surrounding an upstream portion of said conduit; and an external riser, provided with an internal bore, upwardly extending from said conduit, the bore of said riser in communication with said conduit downstream from said valve seat;
    an internal riser, provided with an internal bore, receivable within said external riser, said bore opening into said horizontal sewage conduit;
    a flapper pivotally engaging said internal riser adjacent the lowermost end of said internal riser, said flapper operable to seatingly engage said valve seat to prevent backflow of sewage within said conduit; and
    alignment means and mounting means for securing said internal riser and said flapper within said valve body for valve operation and permitting reciprocal withdraw of said internal riser with said flapper as a single unit for maintenance; and
    wherein the bores of said external and internal risers are curved toward a downstream portion of said horizontal conduit and away from said flapper for directing maintenance cables downstream during cleanout procedures.

2. Sewer cleanout and check valve apparatus comprising:
    a valve body having a substantially inverted T shape, said valve body provided with a horizontal sewage conduit and an upright external riser, with internal bore, intersecting with and in communication with said sewage conduit; said sewage conduit defining an upstream portion and a downstream portion, said upstream portion provided with an annular valve seat thereabout;
    an internal riser provided with an unobstructed tubular bore, said internal riser mountable within said external riser; and
    a flapper pivotally mounted on said internal riser for seating on said valve seat of said valve body to provide a backtrap; and
    wherein said internal bore of said external riser is provided with a slotted guide ring affixed within its bore and wherein said internal riser includes a slot key for engaging a slot of said guide ring for aligning and securing said internal riser therein for ready insertion, and removal of said internal riser and said flapper as a single unit for maintenance.

3. The apparatus as described in claim 2 wherein said valve body is provided with an internal riser mount located above the upstream portion of said horizontal conduit and wherein said internal riser is provided with a mounting surface registerable with said internal riser mount of said valve body for supporting said internal riser at a selected distance above said horizontal conduit of said valve body.

4. The apparatus as described in claim 3 wherein said internal riser mount is provided with a pin slot and wherein said internal riser is provided with a downwardly depending pin receivable within said pin slot for holding said internal riser in place relative to said valve body.

5. The apparatus as described in claim 2 wherein the internal bore of said external riser defines a concave arc adjacent its intersection with the downstream portion of said horizontal conduit and wherein the internal bore of said internal riser defines a like arc to direct a cleanout tool placed therethrough to the downstream portion of said horizontal conduit and away from said flapper.

6. The apparatus as described in claim 2 wherein said flapper is pivotally mounted on said internal riser above said horizontal conduit and wherein said flapper engages said valve seat of said valve body radially outward of the periphery of conduit to provide unobstructed flow of sewage from the upstream portion to the downstream portion of said conduit.

7. The apparatus as described in claim 2 wherein the longitudinal axis of the upstream portion of said horizontal conduit is above the longitudinal axis of the downstream portion of said horizontal conduit to provide a downward flow of sewage for compensating for loss of energy in the pivoting of said flapper by the sewage for superior sewage flow.

* * * * *